H. W. DUNBAR AND A. TURNER.
ELECTRICALLY DRIVEN GRINDING MACHINE.
APPLICATION FILED DEC. 1, 1920.
1,429,025.
Patented Sept. 12, 1922.
4 SHEETS—SHEET 1.
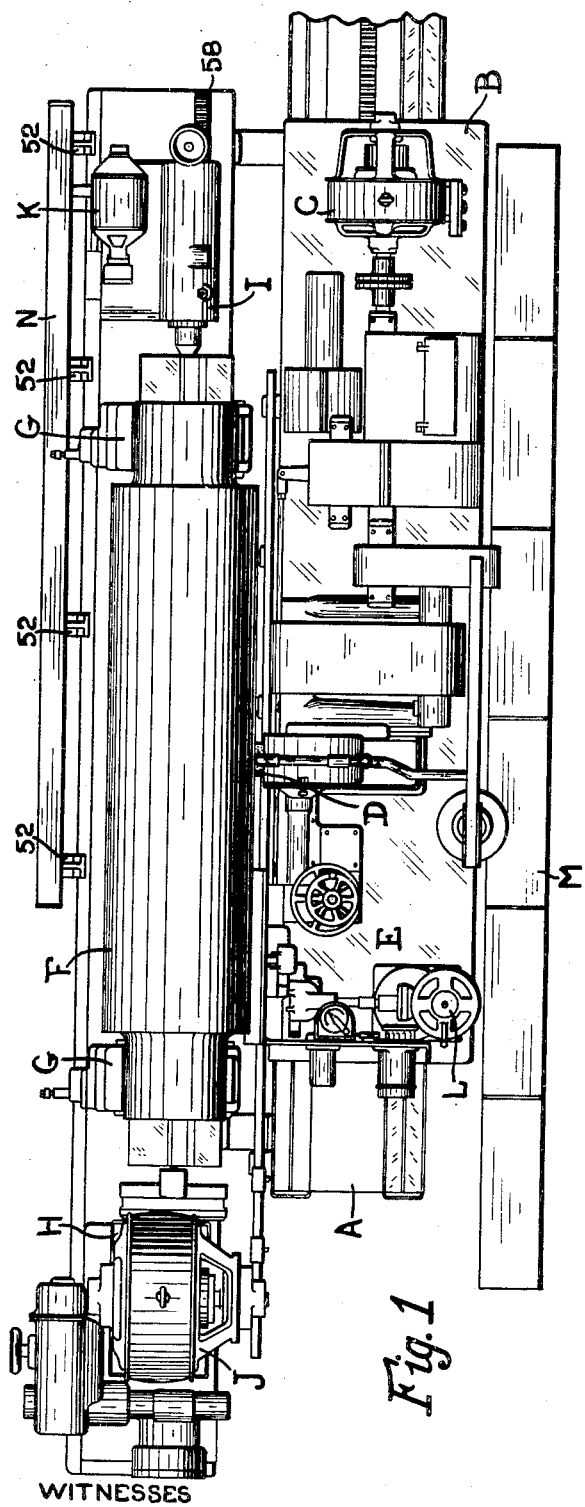
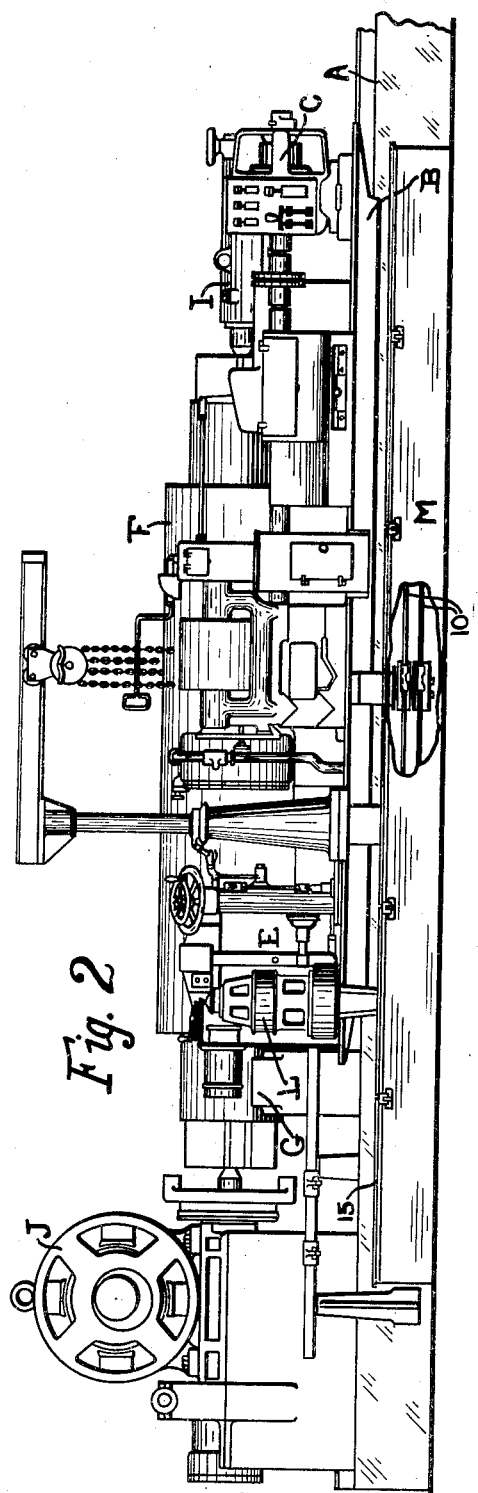
WITNESSES
Harold W. Eaton
J. Calvin Bright
INVENTORS
Howard W. Dunbar
Albert Turner
BY
Clayton R. Jenkins
ATTORNEY

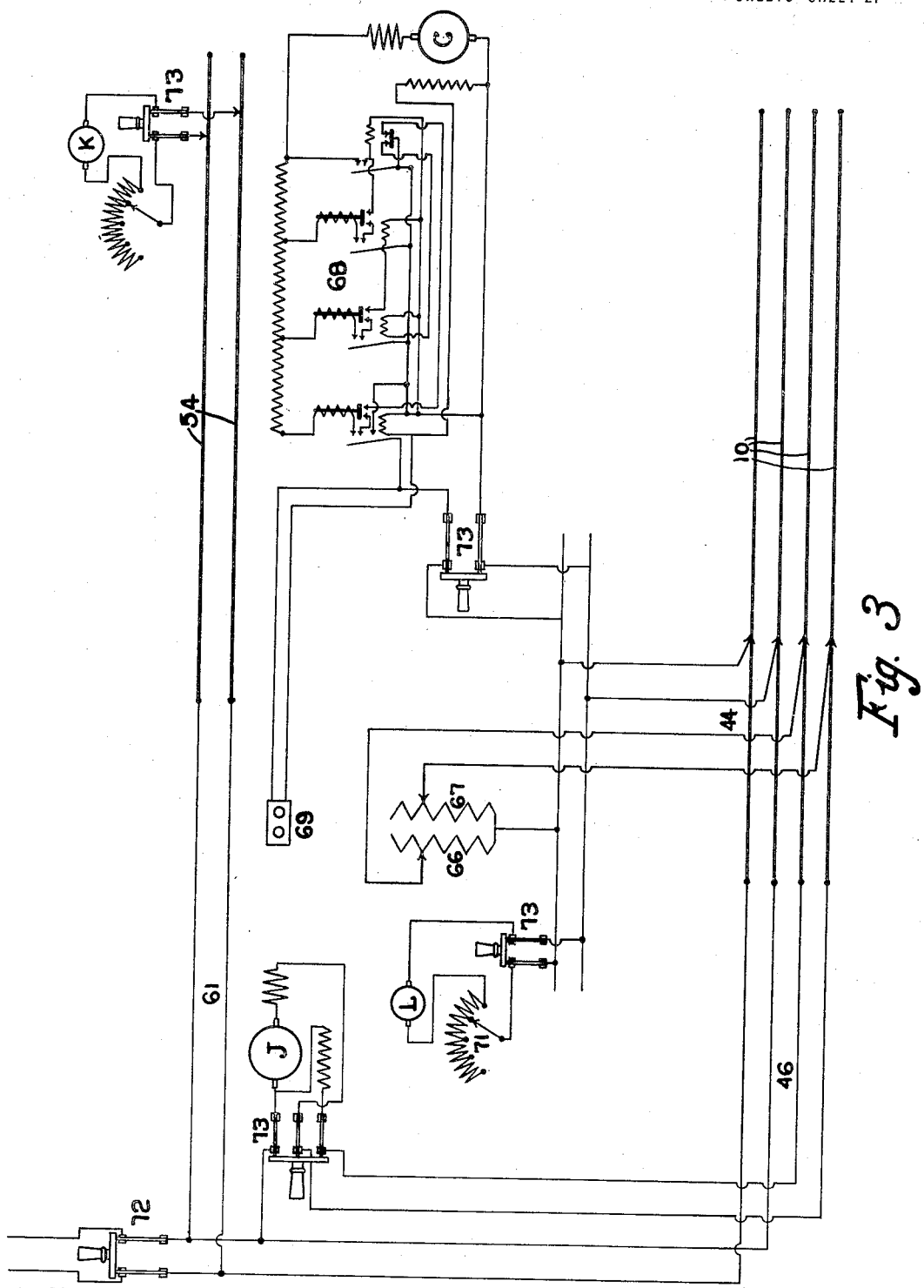

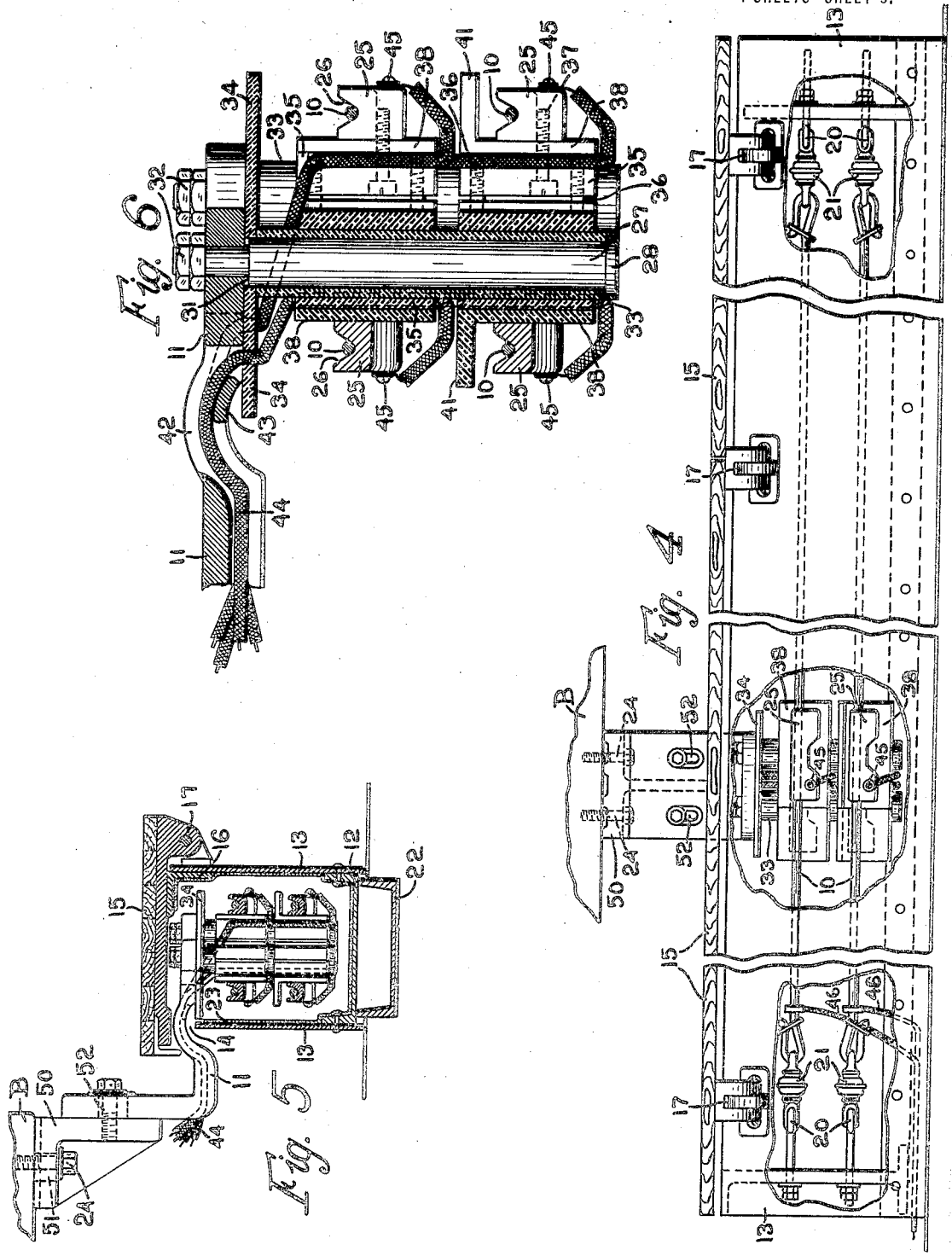

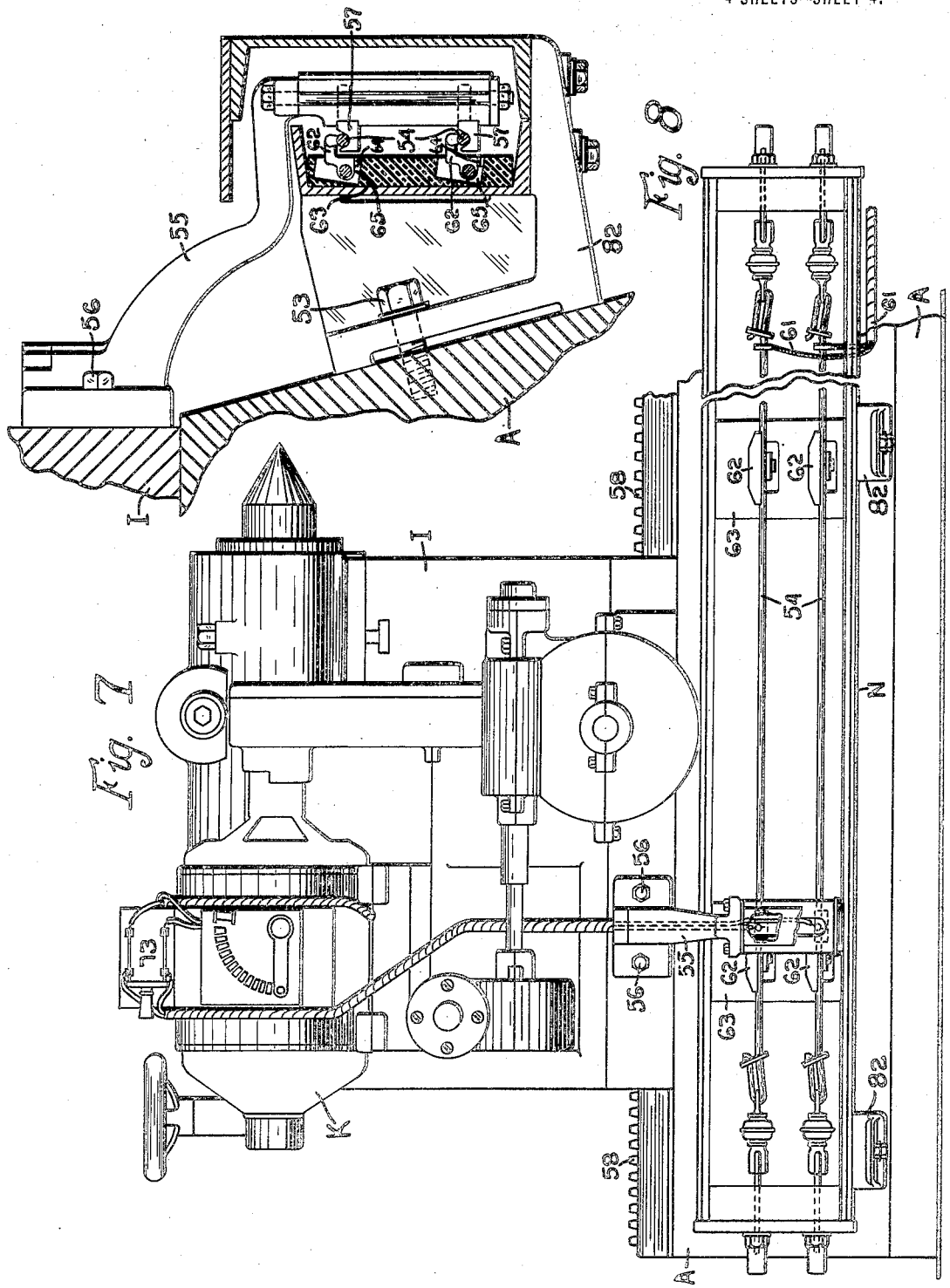

Patented Sept. 12, 1922.

1,429,025

UNITED STATES PATENT OFFICE.

HOWARD W. DUNBAR AND ALBERT TURNER, OF WORCESTER, MASSACHUSETTS, ASSIGNORS TO NORTON COMPANY, OF WORCESTER, MASSACHUSETTS, A CORPORATION OF MASSACHUSETTS.

ELECTRICALLY-DRIVEN GRINDING MACHINE.

Application filed December 1, 1920. Serial No. 427,544.

*To all whom it may concern:*

Be it known that we, HOWARD W. DUNBAR and ALBERT TURNER, citizens of the United States of America, residing at Worcester, in the county of Worcester and State of Massachusetts, have invented certain new and useful Improvements in Electrically-Driven Grinding Machines, of which the following is a full, clear, and exact specification.

Our invention relates to grinding machines and more particularly to machines of large size, such as the roll grinding machine shown in the patent to Norton No. 1,096,188, May 12, 1914.

In machines of this type it is customary, because of the size and weight of the work, to traverse the wheel along the work, and the various movable parts of the machine are usually driven by electric motors.

It is an object of our invention to generally improve the construction and utility of such machines and more particularly to control the various motors from an operator's station on the moving table, and to this end we employ one or more trolley systems in connection with our machine for readily conveying current from an outside source to the motors and the operator's control station.

It is a further object of our invention to have these trolley systems arranged in convenient relation to the operator's position and other parts of the machine, to enclose them in suitable box-like protective housings and to make provision for the mounting of the elements of the system to provide for ready adjustment and to prevent short circuiting.

With these and other objects in view, as will appear from the following disclosure, our invention resides in the combination of parts set forth in the specification and covered by the claims appended thereto.

Referring to the accompanying drawings:

Fig. 1 is a plan view of our improved machine showing the trolley boxes in their relation to the rest of the machine;

Fig. 2 is a front elevation thereof showing a part of the front trolley box broken away;

Fig. 3 is a diagrammatic view showing the wiring connections between the line wires and control station and the various motors;

Fig. 4 is an enlarged view of the trolley box arranged at the front of the machine and shown in Figs. 1 and 2, parts being broken away to show the interior construction;

Fig. 5 is a cross sectional view of the trolley box in front of the machine showing the connection between the collector arm and the traversing table;

Fig. 6 is an enlarged detail sectional view of that portion of the collector arm normally traversing within the box;

Fig. 7 is an enlarged view of the tailstock showing the motor thereon and the means for conveying current thereto; and Fig. 8 shows an enlarged cross section through the trolley box shown in Fig. 7, and a portion of the machine showing the connections between the two.

Referring to the drawings, we have there illustrated a machine for grinding large work, such as the rolls of printing presses, of rolling mills for rolling metal, and so forth, the main operative parts of the machine, except as is hereinafter particularly pointed out, being constructed and arranged substantially as shown in the patent to Norton above referred to. On the base A is mounted for reciprocation the wheel table B carrying the motor C for reciprocating it and for driving the wheel D. The operator's control station E is also located on the movable table. The work F is mounted for rotation on suitable bearing members G arranged between the headstock H and tailstock I, one or both of the latter, in this case the tailstock, being adjustable to allow of bringing the work between the usual centers. The motor J for driving the work we preferably mount directly on the headstock, as in the patent above referred to, and because of the great weight of the movable tailstock we provide a motor K for moving it. On the table B adjacent the operator's control station we also mount a small motor L for operating the pump which supplies the cooling liquid to the grinding wheel and work. Trolley boxes M and N are conveniently arranged at the front and the back of the machine respectively to form a part of a convenient and compact arrangement for connecting the various motors with the source of energy supply (not shown) and with the operator's control station, and it is more particularly with the manner and means of supplying current to the various operative parts of the machine, so that it can be controlled from a point on the machine where the operator can readily observe the action of the wheel on the work, that my invention has to do.

It will be noted that the motors C, J and L are all to be controlled from the control station E on the movable table and that the current for operating the motors on the movable table is to be led thereto from an external source (not shown). From this arrangement it will be obvious that provision will have to be made in the electrical connections for connecting the source of energy supply with the control station and the motors on the movable table, and also the control station with the motor on the headstock. This is conveniently accomplished by a trolley system having its cooperating parts arranged in the trolley box M. This trolley system consists of conductors 10 stretched longitudinally of the box and a contactor arm 11 slidingly cooperating therewith, the latter being connected to the traversing table B. We have shown four such conductors in the present instance but this number could obviously be varied with the type of motors controlled from the control station and the kind of current used, whether alternating or direct current.

We may form this trolley box conveniently and economically by utilizing a channel iron bar 12 for the bottom of the box and connecting to the upright flanges on said bar flat sheet iron strips 13 to form the sides of the box, that side of the box adjacent the machine base A being lower than the opposite side to form an opening or slot 14 between it and the hinged cover 15 of the box in order to accommodate the contactor arm 11. The high side 13 has its upper portion reinforced by an angle iron bar 16 which serves also as a support for the cover when the latter is in its closed position. The cover is preferably made in sections, each section being connected by a plurality of hinges 17 to the side of the box. In order to preclude the possibility of the entrance of foreign bodies or water into the box, which might result in short circuiting the conductors, we make the cover sections considerably wider than the width of the box, so that they project laterally on both sides of the box and also form their forward edges with a depending flange. To further guard against the entrance of water or dirt, we cover the narrow slit between adjacent sections. We preferably accomplish this by having one of the hinges project beyond the end of a section to overlap the end of the next adjacent section (see Fig. 4). To allow the full traverse of the table, the box is obviously made of a length somewhat greater than the longest traverse of the table. The conductors 10 are suitably anchored to the ends of the box at spaced points by means of eye bolts 20 and insulators 21, the insulators being inserted between the eye bolts and the ends of the conductors. We have shown the bottom of the box raised slightly above the level of the floor and supported on the channel iron bar 22 which provides an even support and prevents the entrance of water into the box. The sides and bottom of the box are lined by a suitable insulator such as sheet asbestos 23, which is in turn secured into the box and covered by shellac or other suitable material, all of which tends to make the box waterproof and guards against short circuiting, should one of the conductors touch the side of the box.

The collector arm 11 is suitably fastened to that portion of the table B overhanging the base A, as by means of screws 24, and it is formed with a substantially vertical portion extending to a point slightly lower than the upper edge of the adjacent side plate 13 of the trolley box and from this point it extends laterally at right angles to the box and is then curved upwardly where it passes through the slot 14, and ends within the box in a substantially horizontal portion, as shown in Fig. 5. To this inner end of the arm we attach the four contact shoes 25 and we have provided very efficient insulating means to properly insulate these shoes from each other and from the arm. These contact shoes are formed with grooves 26 which slidably receive the conductors 10. To connect the shoes to the inner horizontal end on the collector arm 11, we preferably provide two vertical studs 27 having their lower ends headed as at 28 and their upper ends reduced in diameter to form shoulders 31. These reduced portions pass through holes in the arm and the studs are held in place by nuts 32 on the screw threaded ends of the reduced portions. Surrounding each of the studs 27 is an insulating bushing 33 and in order to prevent the conductors contacting with the arm 11, if for any reason they should jump upwardly, we preferably clamp a sheet 34 of insulating material between the upper end of the bushings and the arm, the sheet being provided with openings for the passage of the studs. We have shown only two contact shoes 25 mounted on each stud for ease of assembly, ready individual adjustment of the shoes and proper insulation, and have, for a like reason, attached the studs to the arm in staggered relation.

Each shoe may be connected to its stud by means of a two-part clamp of insulating material 35 which fits on the bushing 33 and is clamped thereon as by means of screws 36. These clamps can be adjusted vertically to bring the shoe into proper operative relation with its conductor and also to compensate for wear. The shoe is fastened to one of the clamping sections by means of screws 37 but between each shoe and its clamp is arranged another insulating strip 38, these strips extending beyond the clamping device 35 at each end. It will be noted that two shoes are arranged one vertically above the other on each stud and in order to prevent all possibility of short circuiting in case the upper conductor should jump out of the groove in its cooperating shoe and sag sufficiently to touch the lower conductor, we form the lower insulating strip 38 with a horizontally extending portion 41 which overlies the lower shoe, effectively preventing any contact between the two conductors. The arm 11 is slotted as at 42, leaving however a bridging member 43 (Fig. 6) for supporting the insulated wires 44 passing through the slots to the contact shoes where they are bared and are connected to the contact shoes by means of binding posts or screws 45, as shown clearly in Fig. 6, the wires being so arranged that they will not be fouled by the conductors 10. These wires, of course, electrically connect the conductors 10 to the operative parts on the moving table. The conductors 10 are in turn connected to insulated wires 46 (Fig. 4) leading to the source of power (not shown) and the headstock motor, respectively, as clearly appears in the wiring diagram, Fig. 3.

To allow of the adjustment of that part of the collector arm 11 which extends into the trolley box, we preferably connect the vertically extending portion of the arm to a bracket 50 which is in turn connected by screws 24 to the table B. This bracket is adjustable laterally by having the screws 24 extend through slots 51 in the bracket, this adjustment being for the purpose of properly and readily aligning the contact shoes with the conductors 10. To provide for the ready positioning of the contactor arm 11 vertically to center it in the slot 14 and, in some cases, to compensate for wear between the shoes and the conductors, we provide a similar slotted screw connection 52 between the bracket 50 and the vertically extending portion of the arm.

In order to convey current to the motor K on the movable tailstock in all operative positions of the latter, we preferably employ a trolley system arranged for the most part in the trolley box N, which latter may be supported on bracket 82 secured to the base A by means of screw bolts 53. Within this box conductors 54, in this instance two such conductors, are stretched and properly insulated from the box and from each other in a manner similar to the conductors 10. The collector arm 55, connected to the tailstock in any suitable manner, as by screw bolts 56, carries two contact shoes 57 suitably insulated, these shoes being electrically connected by wires to the motor K, the latter driving through a suitable train of gearing (not shown) the stationary rack 58 on the base, whereby rotation of the motor geared to the rack serves to move the tailstock to a desired position. The conductors 54 are connected to the source of energy supply (not shown) by insulated wires 61.

We have shown the trolley box M arranged adjacent the front of the machine and of such a height that it serves conveniently as a step for going to and from the operator's position on the machine. In connection with the trolley box N, we have shown (Figs. 7 and 8) a means for supporting the conductors intermediate their ends to prevent undue sagging, which might sometimes occur in a machine of this kind adapted to carry work having a wide range in length. This means comprises supporting arms 62 pivoted at one end to an insulating block 63 attached to the side of the box adjacent the contact shoes on the arm 55 and having their other ends connected to the upper portion of the conductors 54. These arms have a limited pivotal movement to allow them to be raised when the contact shoes pass thereunder and are shaped to allow such passage without obstruction. The downward swinging movement of the arms is limited by abutments 64 thereon striking the bottom of the recesses 65 in the insulating block in which they are pivoted. As many of these supports as desired may be utilized. A similar supporting means could be used in connection with the conductors 10 in the trolley box M, if desired.

Referring to Fig. 3, we have there shown diagrammatically a system of wiring which may be used in carrying out our invention. This system of wiring is adapted for the use or direct current. We have shown the motor J as a variable speed motor controllable from the two variable resistances 66 and 67 at the operator's station on the movable table B. These resistances may take the form of a drum controller, one of them, 66, varying the resistance of the field of the motor and the other, 67, the resistance of the armature. The motor C is preferably a constant speed motor, the speed of traverse of the table being secured by change speed gearing as in the patent to Norton above referred to, and we preferably control this motor from the operator's station by a remote control system including a magnetic switch 68 and a push button or buttons 69. The pump motor L is preferably located on the table B near the operator's station and the starting resistance 71 therefor is in convenient reach of the operator. The rheostatic control for the tailstock motor K is preferably placed on the motor, for since this motor is only operated when it is desired to place the tailstock in the correct position for various lengths of work, it is not necessary or desirable to provide a control therefor from the operator's station on the movable table B. Each of the motors is provided with a cutout switch 73 and a main switch 72 is placed between the source of energy supply (not shown) and the conductors connecting said source with the various operative parts on the machine.

It is obvious that changes may be made in the specific construction of our device and that equivalent elements may be substituted for the parts herein disclosed without departing from the scope of our invention as expressed in the claims appended hereto.

Having thus described our invention, what we claim as new and desire to secure by Letters Patent is:

1. A grinding machine comprising a base having ways, a table reciprocable thereon, a grinding wheel rotatively mounted on the table, a motor on said table for rotating the wheel, and means for conveying current to said motor in all operative positions of the table, comprising a trolley system including conductors extending parallel with said ways and a collector arm cooperating therewith, one of said cooperating members being mounted on the base and the other connected to the table to move therewith.

2. A grinding machine comprising a base having ways, a table reciprocable thereon, a motor on said machine apart from said table, a control station for said motor on said table, and means for conveying current to said motor and control station, comprising a fixed conductor mounted on the base parallel to said ways and a collector arm on the table cooperating with the conductor in all operative positions of the table.

3. A grinding machine comprising a base, a wheel traversing table slidable thereon, a motor on said table, a second motor on said machine, a control station for said motor on said table, and means for electrically connecting said motor with the source of energy supply and said control station respectively, comprising a trolley system including conductors and a collector arm cooperating therewith, one of said cooperating members being connected to the table to move therewith.

4. A grinding machine comprising a base, a wheel traversing table slidable thereon, a motor on said table for traversing it and rotating the wheel, a work rotating motor supported on said base, a control station for said motors on said table, and means for electrically connecting said motors with the source of energy supply and said control station respectively, comprising a trolley system at one side of the machine, a work support slidable on said base, a motor thereon for moving it, and a second trolley system at the opposite side of the machine for conveying current to said last-mentioned motor.

5. A grinding machine comprising a base, a table slidable thereon, a grinding wheel rotatively mounted on the table, a motor on said table for rotating the wheel and means for conveying current to said motor, comprising a trolley box arranged adjacent the front of the machine below the table, conductors extending longitudinally of said box and insulated therefrom, and a collector arm depending from the table and having contacts cooperating with said conductors, said arm being adjustable in two directions to align its contacts with the conductors and compensate for wear.

6. A grinding machine comprising a base, a carriage slidably mounted thereon, a motor and an operator's control station on said carriage, and electrical connections between said control station and said motor and the source of energy, comprising a trolley system arranged along one side of the machine, a box substantially enclosing said system, the top of said box forming a convenient step to reach the operator's control station for any position of the table.

7. A grinding machine comprising a base, a table slidable thereon, a motor on said table, and means for conveying current to said motor in all operative positions of the same, comprising a trolley system, a housing substantially enclosing said system and mounted adjacent the machine, and a sectional cover forming the top of said housing, whereby ready access can be had to the interior thereof for inspection or repair.

8. A grinding machine comprising a base, a table slidable thereon, a motor on said table, and means for conveying current to said motor in all operative positions of the same, comprising a trolley system, a housing substantially enclosing said system and mounted adjacent one side of the machine, and a cover for said housing consisting of hinged sections forming the top of said housing, the hinge at one end of each cover section being arranged to overlap the end of the next succeeding section, whereby the narrow slit between adjacent sections is covered to exclude water and dirt.

9. A grinding machine comprising a base, a work support slidable on said base, means including a motor on the support for moving it, and means for conveying current to said motor, comprising a plurality of conductors supported on said base and a collector arm on said support cooperating with said conductors.

10. A grinding machine comprising a base, a work support slidable on said base, means including a motor on the support for moving it, and means for conveying current to said motor, comprising a plurality of conductors supported on the base and a collector arm on said support cooperating with said conductors, and means arranged intermediate the ends of the conductors for supporting them to prevent undue sagging.

11. A grinding machine comprising a base, a tailstock slidably mounted on said base, a motor on said tailstock for moving it, and means for conveying current to said motor, comprising a plurality of conductors supported on and insulated from said base and a collector arm on said tailstock having contact members in engagement with said conductors, and supporting arms for said conductors arranged intermediate the ends of said conductors and pivotally mounted on the base to allow upward movement of the conductors under the influence of the contact members, and stops for said supporting arms allowing only a very limited downward movement thereof.

12. A grinding machine comprising a base, a table slidably mounted thereon, a motor on said table and means for conveying current to said motor, comprising a trolley box arranged adjacent the sliding table, conductors extending longitudinally of the box and insulated therefrom, and a collector arm bearing contact members cooperating with said conductors, said contact members being individually adjustable to align them with their respective conductors or to compensate for wear.

13. A grinding machine comprising a base, a table slidably mounted thereon, a motor on said table and means for conveying current to said motor, comprising a trolley box arranged adjacent the sliding table, vertically spaced conductors extending longitudinally of the box and insulated therefrom, a collector arm bearing contact members cooperating with said conductors, and insulating means connecting said contact members to said arm and for preventing short circuiting of said conductors in the normal operation of the machine, said insulating means including substantially horizontally extending members arranged between the vertically spaced conductors.

Signed at Worcester, Massachusetts, this 29th day of Nov. 1920.

HOWARD W. DUNBAR.
ALBERT TURNER.